UNITED STATES PATENT OFFICE.

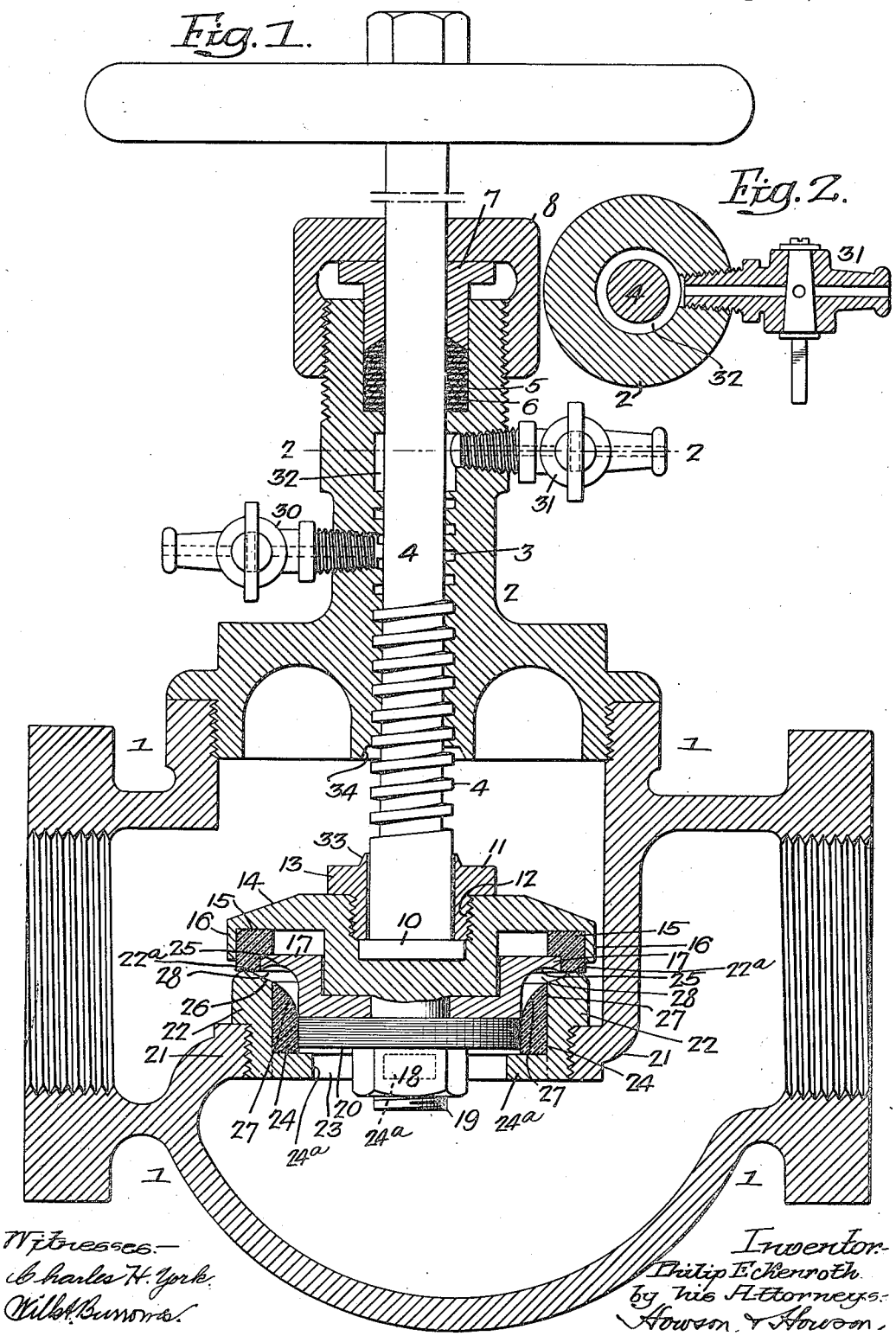

PHILIP ECKENROTH, OF PHILADELPHIA, PENNSYLVANIA, ASSIGNOR OF SIX TWENTY-FIFTHS TO WILBUR F. HAMILTON, OF CYNWYD, PENNSYLVANIA, AND SIX TWENTY-FIFTHS TO FRANK J. MILON, OF WILLIAM PENN, PENNSYLVANIA.

VALVE.

1,317,563.      Specification of Letters Patent.      Patented Sept. 30, 1919.

Application filed June 29, 1914. Serial No. 847,987.

*To all whom it may concern:*

Be it known that I, PHILIP ECKENROTH, a citizen of the United States, residing in Philadelphia, Pennsylvania, have invented certain Improvements in Valves, of which the following is a specification.

My invention relates to valves, more particularly those of the globe type; and one object of my invention is to provide an improved structure with a novel form of seat and packing therefor, which structure is so designed and arranged as to prevent cutting of said seat and subsequent wire drawing of the steam or other fluid controlled by said valve.

These features of my invention are more fully described hereinafter, reference being had to the accompanying drawings, in which:

Figure 1, is a sectional elevation of my improved valve, and

Fig. 2, is a sectional plan view on the line 2—2, Fig. 1.

In Fig. 1 of the drawings, 1 represents the body of the valve, which carries the usual bonnet 2, internally threaded at 3 for the reception of a threaded valve stem 4; such bonnet 2 having a recess 5 receiving packing 6 for said stem, which packing may be held in place by a gland 7 confined in place and set up by a screw cap 8. In the present instance, the stem 4 has an enlarged head 10 at its lower end supporting a collar 11 externally threaded at 12. This collar has a shoulder 13 and carries what may be termed a compound valve piece, made up of a member 14 receiving a packing ring or gasket 15, which packing ring is confined by an annular flange 16 of said member 14. The packing ring 15 is held in place by a disk or ring 17 which is confined to the member 14 by a nut 18 on a threaded stem 19 of said member 14; a disk or ring 20 forming an additional packing element and serving as a steam or fluid retarding surface being interposed between said nut 18 and the retaining ring 17.

Carried by the usual diaphragm or wall 21 of the valve casing is a ring 22 forming a seat for the valve; said ring being shown in the present instance as threaded into said diaphragm and having an engaging surface 22ª for contact by the gasket 15. It will be understood, however, that the seat, with an engaging surface for contact with said gasket, may be integral with said wall 21. The ring 22 in the present instance is provided with a central aperture 23 of reduced area for the passage of steam or other fluid; thereby preventing direct discharge of the liquid or fluid passing through valve against valve seat, disk and gasket or packing carried by the disk. This ring carries an annular packing ring 24, supported by lugs ? for coöperative engagement with the p. ing ring 20; said parts first engaging when the valve is being closed to cut off the passage of steam, and practically effecting such action before the gasket or packing ring 15 engages the surface 22ª of the ring 22 forming the valve seat. The ring 17 is annularly recessed at 25 adjacent the packing 15; the ring 22 is slightly hollowed at 26 adjacent the seat, and the packing ring 24 is cut away to the curved outline as shown at 27, and this construction of the several parts provides an annular space or chamber 28 between the several members for the reception of any steam or other liquid leaking past the contacting surface between the packing members 20 and 24 as the valve is closing, and in which space such steam or other fluid may expand and thereby lose its cutting force.

The packing rings 20 and 24 provide steam retarding or cutting surfaces which, when worn or destroyed, may be readily renewed without difficulty, and their presence, in the position indicated, prevents the cutting of the main gasket or packing 15 and the surface 22ª of the ring 22 forming the valve seat engaged thereby. It will also be noted that the space or chamber 28 receives the initial supply of steam or other fluid leaking past the surfaces of the sections 20 and 24 during the operation of opening the valve.

This annular space provides an enlarged area for the increased volume due to expansion of any steam, liquid, gas, or other fluid leaking past the surfaces, thereby reducing the pressure of the same, in consequence of which the engagement of the packing or gasket 15 with or separation from the surface 22ª of the ring 22 forming the valve seat is accomplished at all times with practically no pressure between their faces, thereby reducing the cutting action of the fluid or liquid controlled by said valve to a minimum.

In addition, my improved construction provides a valve seat set some distance outwardly from the wall of the opening 23 admitting steam or other fluid, thereby preventing direct discharge of the liquid or fluid past the valve against the gasket or packing carried by the same. In my improved valve structure, the force of this fluid, steam, water, &c., is directed against the curved surfaces 25 and 26 formed on the retaining ring 17 and valve seat ring 22, respectively, which surfaces are designed to absorb the cutting action and deflect the passing fluid or liquid.

In valves of this character, difficulty has always been experienced in packing the stem of the same. As may be readily understood, if the stem is leaking and it becomes necessary to repack the same, the pressure following along the stem would tend to lift the packing from its seat, thereby preventing proper filling of the same, in one instance, while endangering the hands of the operator, in the case of steam or dangerous fluids or gases, in other instances. This feature of my invention, for which, however, no claim is made herein, consists in providing means for diverting any leaking steam, liquid, or other fluid passing along the stem 4 before it reaches the packing chamber 5.

In the arrangement shown in Fig. 1, this may be accomplished by means of small pet cocks 30 and 31 tapped into the upper portion of the bonnet 2, one pet cock being disposed opposite the threads of the valve stem, and the other adjacent a recess 32 providing an expansion chamber just below the packing chamber 5. When the packing is to be renewed, the valve is opened to the full extent, and an annular flange 33 on the collar 11 is designed to enter a recess 34 in the bonnet 2 and substantially pack the same to prevent leakage of steam, gas, or other fluid along the threaded stem. As often occurs, however, it is not practicable to make this joint tight, hence the desirability of employing means for tapping or diverting the leaking steam, hot water, and the like, before it reaches the packing chamber.

I claim:

In a valve structure, the combination of a valve casing having a wall or diaphragm with an opening therein, a valve seat ring within said opening and having a plurality of spaced apart valve contacting surfaces, one of which is outwardly disposed with respect to the opening through the ring, a valve stem, a valve piece carried thereby, a plurality of packing rings carried by said valve piece for engagement with the respective contacting surfaces of said seat ring, a disk member for positioning said packing rings on the valve piece, means for securing said disk member and the packing rings to the valve piece, said disk member and valve seat ring being annularly recessed so as to form an annular expansion chamber, and a packing ring carried by the valve seat ring and having an upper convex surface inwardly disposed with respect to the through opening in the diaphragm forming a portion of the wall of said expansion chamber.

In testimony whereof I have signed my name to this specification, in the presence of two subscribing witnesses.

PHILIP ECKENROTH.

Witnesses:
 MURRAY C. BOYER,
 JOS. H. KLEIN.